United States Patent [19]

Brace

[11] Patent Number: 4,860,806

[45] Date of Patent: Aug. 29, 1989

[54] WOODSPLITTING HEAD ASSEMBLY

[76] Inventor: Regie P. Brace, Lot 33 Bert's Trailer Park, 401 South Rt. 7, Milton, Vt. 05468

[21] Appl. No.: 261,694

[22] Filed: Oct. 24, 1988

[51] Int. Cl.[4] .............................................. A01G 23/08

[52] U.S. Cl. ............................ 144/193 E; 144/193 A

[58] Field of Search ............. 144/3 K, 193 R, 193 A, 144/193 D, 193 E, 366; 254/104

[56] References Cited

U.S. PATENT DOCUMENTS 4,337,809 7/1982 Bertoletti et al. .............. 144/193 A 4,391,312 7/1983 Sakraida, Jr. .................... 144/193 E

*Primary Examiner*—W. Donald Bray

*Attorney, Agent, or Firm*—Thomas N. Neiman

[57] ABSTRACT

The assembly comprises a plurality of blades that can be positioned by sliding the blades over the vertical head of the splitter. The vertical head has a series of support ribs that will allow positioning the blades a various heights on the head and have a forward tilt to the blades. The blades project outward from the head and contact the wood first. The blades are designed to provide a plurality of contact points that have a small area of contact with the wood. This results in minimum resistance to the blades entering the wood. The blades have a number of flaring ribs on the blades to increase the splitting force of the woodsplitter. A collar on the blades around the slot that the vertical head slides through forces the wood being split away from the head itself. The rear edge of the blades rest upon support platforms to maintain the angle of the blades. The leading edge of the blades will rise upward as the wood being split pressed forward, but will return to their original position after the wood passes by.

5 Claims, 2 Drawing Sheets

WOODSPLITTING HEAD ASSEMBLY

This invention pertains to woodsplitting devices, and in particular to such woodsplitting devices that are designed to provide a woodsplitting head assembly that utilizes a plurality of splitting blades to allow the blocked wood to be split into more than two pieces during each stroke of the woodsplitter's ram.

The field of wood splitting is old and has many applications. The most common example is the use of a woodsplitter to which a special head has been attached to provide multiple pieces of wood with each stroke of the woodsplitter. A number of devices have been developed to attempt to assist individuals who operate woodsplitters. Examples of these devices include the United States Patent issued to Douglas Nickerson, #4,412,570 issued on 1 Nov. 1983 for a Wood Splitter. This device provides a show a set back horizontal splitting blade positioned on the cutting head that will assist the operator to split the blocked wood into four pieces during a single stroke. Another example of a device which provides a multiple splitting head is the United States patent issued to Gerald J. Sakraida, Jr., #4,391,312 for a Log Splitting Head, issued on 5 July 1983. This device teaches a twin vertical and horizontal cutting edges and means for attaching this head to the woodsplitter. The limitations of these devices are that they require special heads to replace the standard head that comes with the woodsplitter and they do not allow the blades to be moveable in order to improve the splitting capability of the woodsplitter when stringy wood or knots in the wood are encountered. It is another object of this invention to teach moveable cutting blade that has a plurality of small diameter contact points that allow the blade to more easily penetrate the wood being split.

Clearly, it is desirable for a woodsplitting head assembly that does not contain the limitations described above and at the same time is simple and practical to operate. It is the object of this invention, then to set forth an improved woodsplitting head assembly which avoids the disadvantages limitations, above-recited, which obtain in woodsplitting devices.

It is also the object of this invention to teach a woodsplitting head assembly which is simple to install and use and that will able to be used as a add on with standard woodsplitter heads or can replace standard heads with the novel woodsplitting head assembly. It is another object of this invention to teach a woodsplitting head assembly that enables the horizontal splitting blades to move as necessary to overcome obstacles, such as knots and stringy wood. Particularly, it is the object of this invention to set forth a woodsplitting head assembly, for obtaining a plurality of split wood pieces with a single stroke of a woodsplitter, comprising vertical base means; said vertical base means comprises at least one blade support means; said blade support means comprises projections extending outward from the vertical base means; said vertical base means further has blade angling means; moveable cutting means; said moveable cutting blades have apertures centrally located to fit over said vertical support base; said moveable cutting blades further have wood flaring means; and said moveable cutting blades further have vertical base protection means.

Further objects and features of this invention will become more apparent by reference to the following description taken in conjunction with the accompanying figures, in which.

Figure 1:
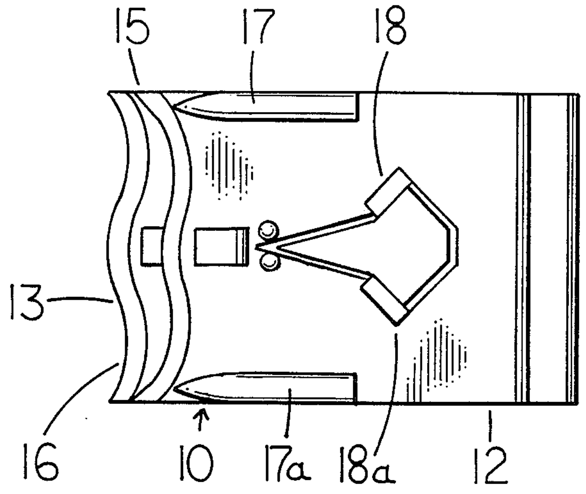
FIG. 1 is a top view of the moveable cutting blades.
Figure 2:
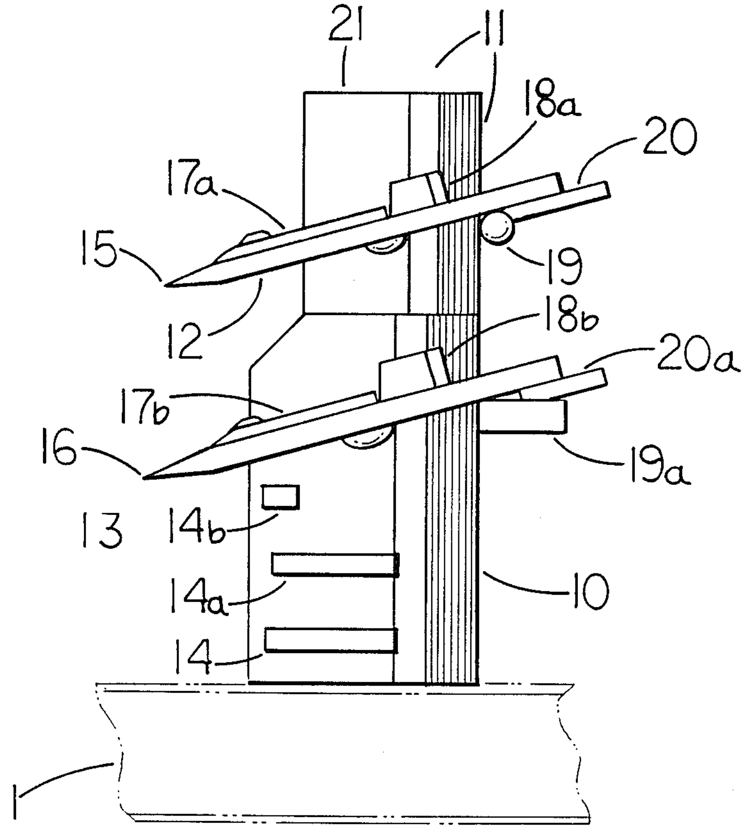
FIG. 2 is a side elevational view of the novel woodsplitting head assembly.
Figure 3:
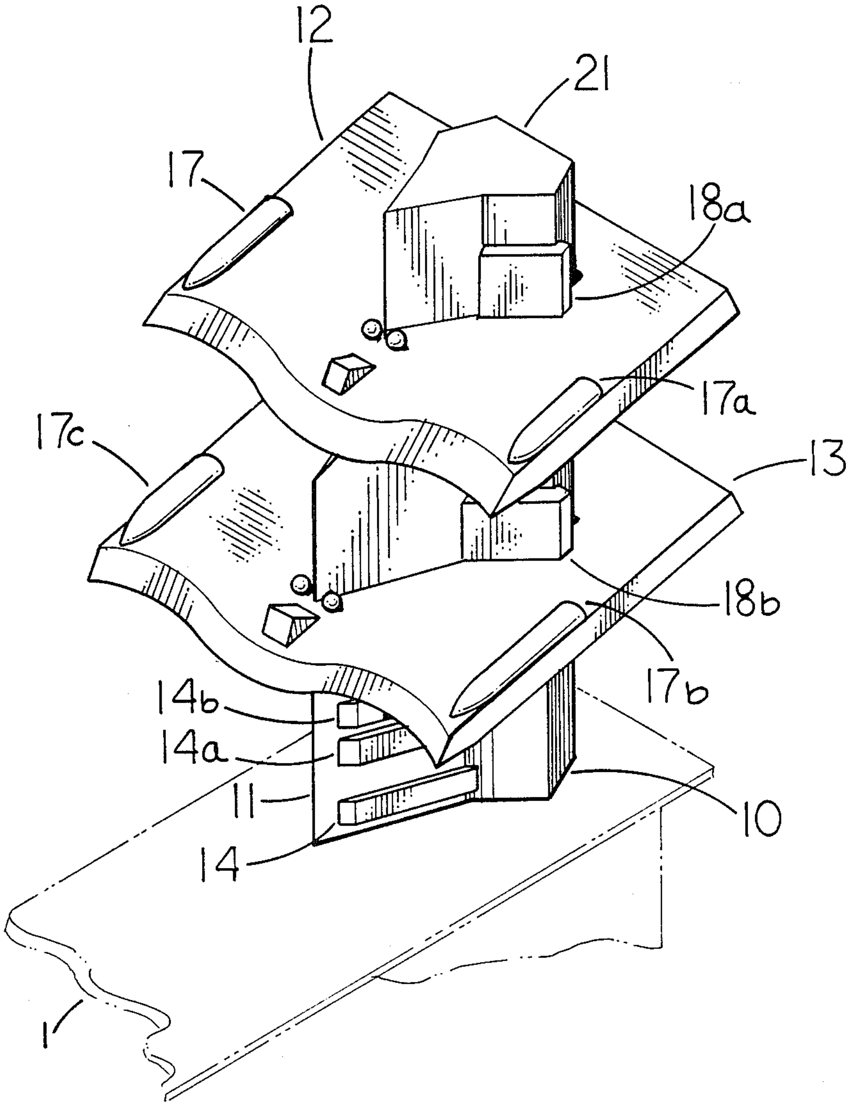
FIG. 3 is a perspective view of the novel assembly in proper position for use.
Figure 4:
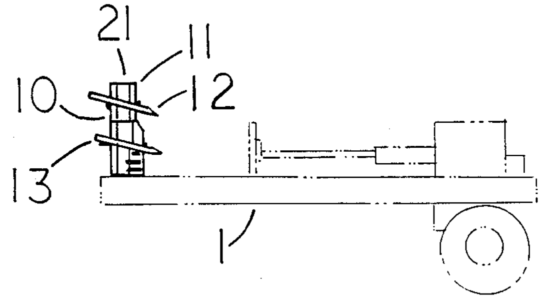
FIG. 4 is a side view of the assembly in position on a woodsplitter.

As shown in the figures, the woodsplitting head assembly 10 comprises a vertical head 11. The vertical head 11 has support ribs 14, **14*a* and 14*b* which provide support at a number of different levels for the lower moveable cutting blade 13. The upper end 21 of the vertical head 11 is designed to fit the upper moveable cutting blade 12. Each of the cutting blades 12 and 13 extend outward from the vertical head 11 and have w-shaped leading edge multiple contact points 15 and 16. These leading edges can also be v-shaped and in that case they would have two contact points rather then the three shown in the figures. These designs allow the blades 12 and 13 to contact the wood at a number of points with very small diameter points, which minimizes resistance and allows the splitter 1** to more easily initiate the splitting of the wood.

The moveable cutting blades 12 and 13 contain a plurality of flaring ribs 17, **17*a*, 17*b* and 17*c*. These ribs tend to lift the wood being split up away from the moveable cutting blades 12 and 13, and increase the speed at which the wood will separate. The blades also have blade collars 18, 18*a*, 18*b* and 18*c* which provide protection for the wide part of the vertical head 11. These collars force the wood to veer horizontally outward from the vertical head to accelerate the splitting action. The reinforced rear ends 20 and 20*a* of the cutting blades rest upon support platforms 19 and 19*a* which are mounted on the back of the vertical head 11. These platforms hold the rear, reinforced edges 20 and 20*a* of the cutting blades 12 and 13 at a level above the cutting edge of the blades. This places the blades in position to contact the wood at a downward angle and, at the same time, will allow the leading edge to lift to an approximate horizontal position, if the wood has knots or is stringy. Additionally, the operator can remove the upper blade 12** if desired to allow for ease of usage in particular situations.

In operation, the user positions the splitter next to a pile of logwood that has been blocked to the desired length. The operator then places the moveable cutting blades over the vertical head of the woodsplitter. Wood is placed upon the main frame of the woodsplitter and the piston is activated. The wood is pushed foward by the ram and contacts the two (v-shaped) or three (w-shaped) small contact points of the moveable blades. The blades will move, as necessary, and the splitting will be initiated. As the wood is continued to be forced forward by the ram, it will come in contact with the flaring ribs and the vertical head. The vertical head will start a vertical split in the wood and flaring ribs will have a lifting action for the horizontal splitting pieces of the wood. As the wood continues, it will encounter the vertical head protection collars which will force the vertical split to veer outward from the vertical head. The results of a single stroke of the woodsplitter will be that a block of wood will be split into six pieces. This will have the effect of lessening the time and effort it takes for an individual to split a cord of wood. Under current conditions, it takes a minimum of three strokes of the splitter to achieve six pieces of split wood. Additionally, having the flexibility of moveable blades speeds up the splitting action of the wood and also being able to remove the cutting blade provides much system flexibility. This assembly can be readily adapted to woodsplitters with standard heads by making minor modifications to the standard head and then using the cutting blades.

While I have described my invention in connection with specific embodiments thereof, it is clearly to be understood that this is done only by way of example and not as a limitation to the scope of my invention as set forth in the objects thereof and in the appended claims.

I claim:

1. A woodsplitting head assembly, for obtaining a plurality of split wood pieces with a single stroke of a woodsplitter, comprising:

vertical base means;

said vertical base means comprising a vertical splitting post attached to the horizontal frame of the woodsplitter;

said vertical base means having at least one blade support means;

said blade support means comprising projections extending outward from the vertical base means;

said vertical base means further having blade angling means coupled to the rear edge of said vertical base means for maintaining said blade at a predetermined angle below level;

moveable cutting blades;

said moveable cutting blades having apertures centrally located to fit over said vertical support base;

said moveable cutting blades further having wood flaring means located on said blades for providing a lifting force on the wood being split; and said moveable cutting blades further having vertical base protection means located on said blades at least partially surrounding said aperture of said blade forcing said wood away from said vertical base means.

2. A woodsplitting head assembly, according to claim 1, wherein:

said blade angling means comprising platforms coupled to said rear edge of said vertical base means for contacting the rear edge of said cutting blades in order for maintaining the leading edge of said blades at a angle slightly below level.

3. A woodsplitting head assembly, according to claim 1, wherein:

said wood flaring means comprising a plurality of ribs projecting upward from said cutting blades for providing a lifting force on the wood being split.

4. A woodsplitting head assembly, according to claim 1, wherein:

said cutting blades having a v or w shaped leading edge points;

said v or w shaped leading edge points comprising small diameter contacts for initiating the splitting force on said wood; and said leading edge points of said cutting blades initiating said splitting force prior to contact of said wood with said vertical base.

5. A woodsplitting head assembly, according to claim 1, wherein:

said vertical base protection means comprising a collar on said blades around said aperture for forcing said wood away from said vertical base.

* * * * *